United States Patent [19]
Fukuda et al.

[11] Patent Number: 5,711,415
[45] Date of Patent: Jan. 27, 1998

[54] ROTARY ELECTRONIC COMPONENT WITH PUSH SWITCH

[75] Inventors: Tetsuya Fukuda, Tsuyama; Tetsuji Ryu, Nishinomiya, both of Japan

[73] Assignee: Matsushita Electric Industrial Co. Ltd., Japan

[21] Appl. No.: 628,809

[22] Filed: Apr. 5, 1996

[30] Foreign Application Priority Data

Apr. 5, 1995 [JP] Japan .................................. 7-079242

[51] Int. Cl.⁶ .......................... H01H 19/20; H01H 13/14
[52] U.S. Cl. .................... 200/570; 200/4; 200/520
[58] Field of Search ................ 200/4, 5 A, 11 TW, 200/28, 178, 179, 520, 570

[56] References Cited

U.S. PATENT DOCUMENTS

| | | | |
|---|---|---|---|
| 4,112,278 | 9/1978 | Greiner et al. | 200/11 TW |
| 4,394,546 | 7/1983 | Harumatsu | 200/5 R |
| 5,047,596 | 9/1991 | Ebishi | 200/4 |
| 5,180,050 | 1/1993 | Rada et al. | 200/4 |
| 5,593,023 | 1/1997 | Kaizaki et al. | 200/570 |

*Primary Examiner*—Stuart N. Hecker
*Attorney, Agent, or Firm*—D. Peter Hochberg; Mark Kusner

[57] ABSTRACT

The present invention provides a rotary electronic component with a push switch which includes a single control knob for assuredly and individually operating a rotary component portion and a push switch. The rotary electronic component with the push switch comprises a rotary component portion such as an encoder portion including a rotary body horizontally rotatable in a fixed position, a knob shaft, a control knob fitted concentrically around the outer periphery of the knob shaft, a resilient portion disposed between the knob shaft and the inner periphery of the control knob, and a push switch portion located outside the control knob, wherein the rotary component portion is actuated by the horizontal rotation of the control knob and the push switch portion is actuated by the horizontal movement of the control knob.

3 Claims, 5 Drawing Sheets

ROTARY ELECTRONIC COMPONENT WITH PUSH SWITCH

BACKGROUND OF THE INVENTION

1. Field of Invention

The present invention relates to a rotary electronic component with a push switch mainly for use in remote controllers for various electronic equipments and portable electronic equipments, which is driven by the horizontal rotation and push of a control knob thereof.

2. Prior Art

Conventionally, an equipment employing an electronic component of this type includes an electronic part such as an encoder to be operated by horizontal rotation, a switch to be operated by a push and a like part, which are provided as separate parts each having a control knob.

[DETAIL DESCRIPTION OF THE INVENTION]

[PROBLEMS TO BE SOLVED BY THE INVENTION]

However, such an electronic component that needs at least two control knobs includes an increased number of parts, which is not preferable in terms of fabrication of the control knobs and part management. The arrangement of two electronic parts requires a large mounting space and individual manipulation of the two electronic parts.

In view of the conventional problems, it is an object of the present invention to provide a rotary electronic component with a push switch which includes a single control knob for two electronic parts and which can assuredly operate the two electronic parts.

[MEANS FOR SOLVING THE PROBLEMS]

SUMMARY OF THE INVENTION

To achieve the aforesaid object, the present invention is intended for a rotary electronic component with a push switch which comprises: a rotary component portion having a rotary body horizontally rotatable in a fixed position; a knob shaft for horizontally rotating the rotary body of the rotary component portion; a control knob concentrically fitted around the knob shaft and movable in one horizontal direction within a predetermined range; a resilient element such as a rubber disposed between the knob shaft and the inner periphery of the control knob; and a push switch portion disposed on one side of the control knob and including an operating portion opposed to the outside of the control knob, the control knob being horizontally rotated to actuate the rotary component portion, the resilient element being compressed to push the control knob in a horizontal direction to actuate the push switch portion.

[FUNCTION]

In the construction described above, if the control knob is horizontal rotated, the rotary component portion is actuated. If the control knob is pushed sidewise in one direction, the resilient element is compressed to move the control knob horizontally. Then, the control knob depresses the operating portion of the push switch opposed to the outside thereof to actuate the push switch. If the depression is released, the control knob is returned by the resilient element. Therefore, the rotary component portion and the push switch can be respectively operated with the single control knob.

DETAIL DESCRIPTION OF PREFERRED EMBODIMENTS

With reference to FIGS. 1 to 5, there will be described a rotary encoder with a switch which is one embodiment of a rotary electronic component with a push switch according to the present invention.

Figure 1:
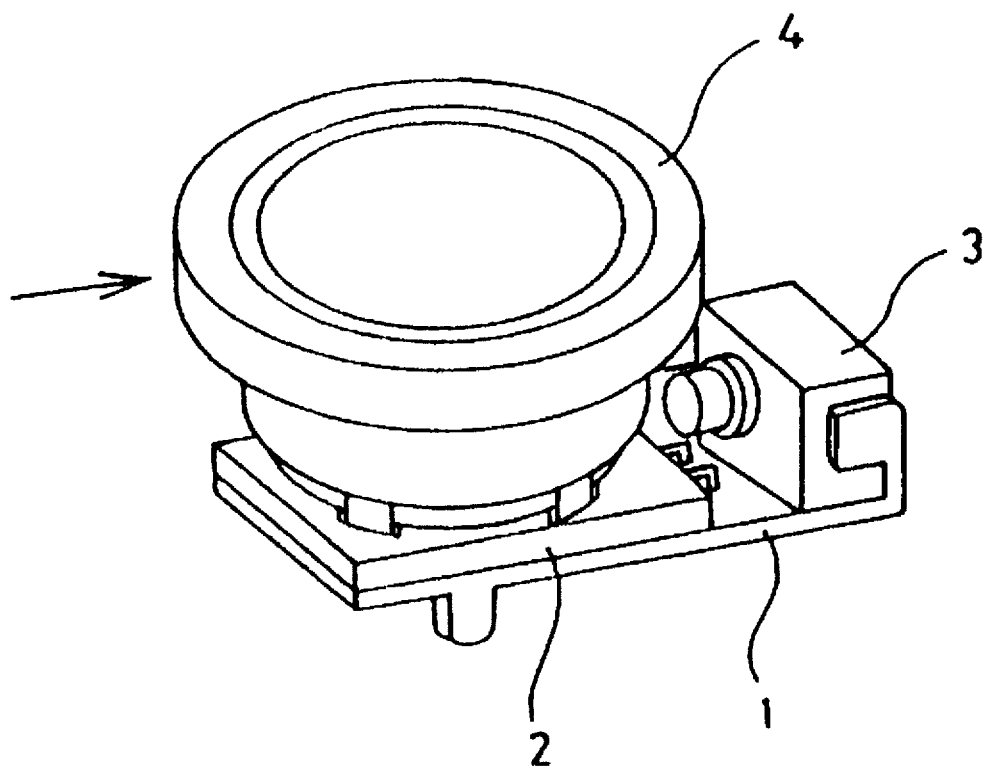
FIG. 1 is an outside perspective view of a rotary encoder with a push switch according to one embodiment of the present invention.

As shown in an outside perspective view in FIG. 1, the rotary encoder with switch according to this embodiment includes a rotary encoder portion 2 and a push switch portion 3 mounted on a mounting plate 1 and spaced a predetermined distance apart from each other. By pushing sidewise a horizontally rotatable control knob 4 of the rotary encoder portion 2, the switch portion 3 is actuated.

The mounting plate 1 need not be made of a metal, but may be molded of a resin.

In the following explanation, the rotary encoder portion 2 and the push switch portion 3 are referred to as an encoder portion 2 and a switch portion 3, respectively.

Figure 2:
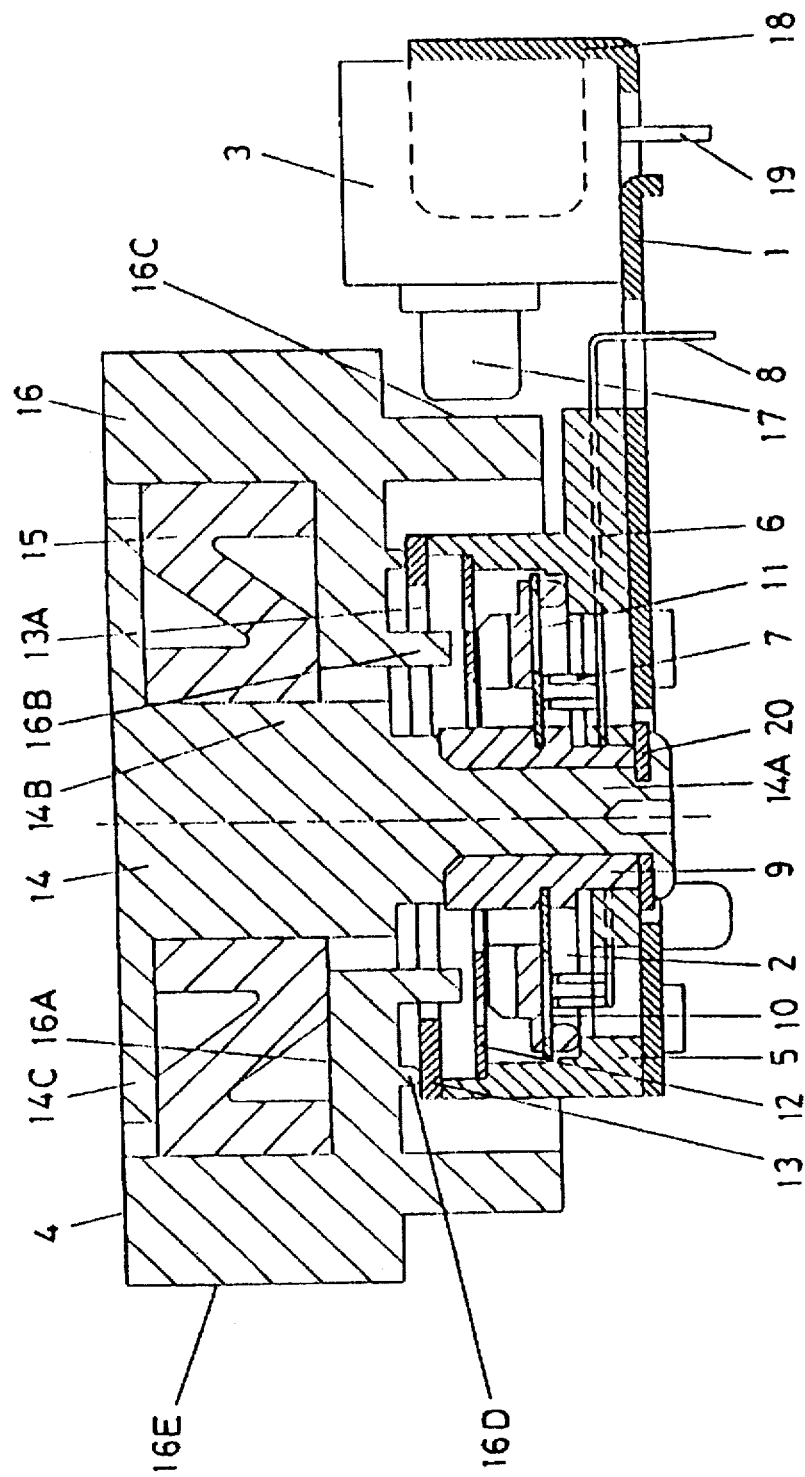
FIG. 2 is a side sectional view of the rotary encoder with the push switch.
Figure 3:
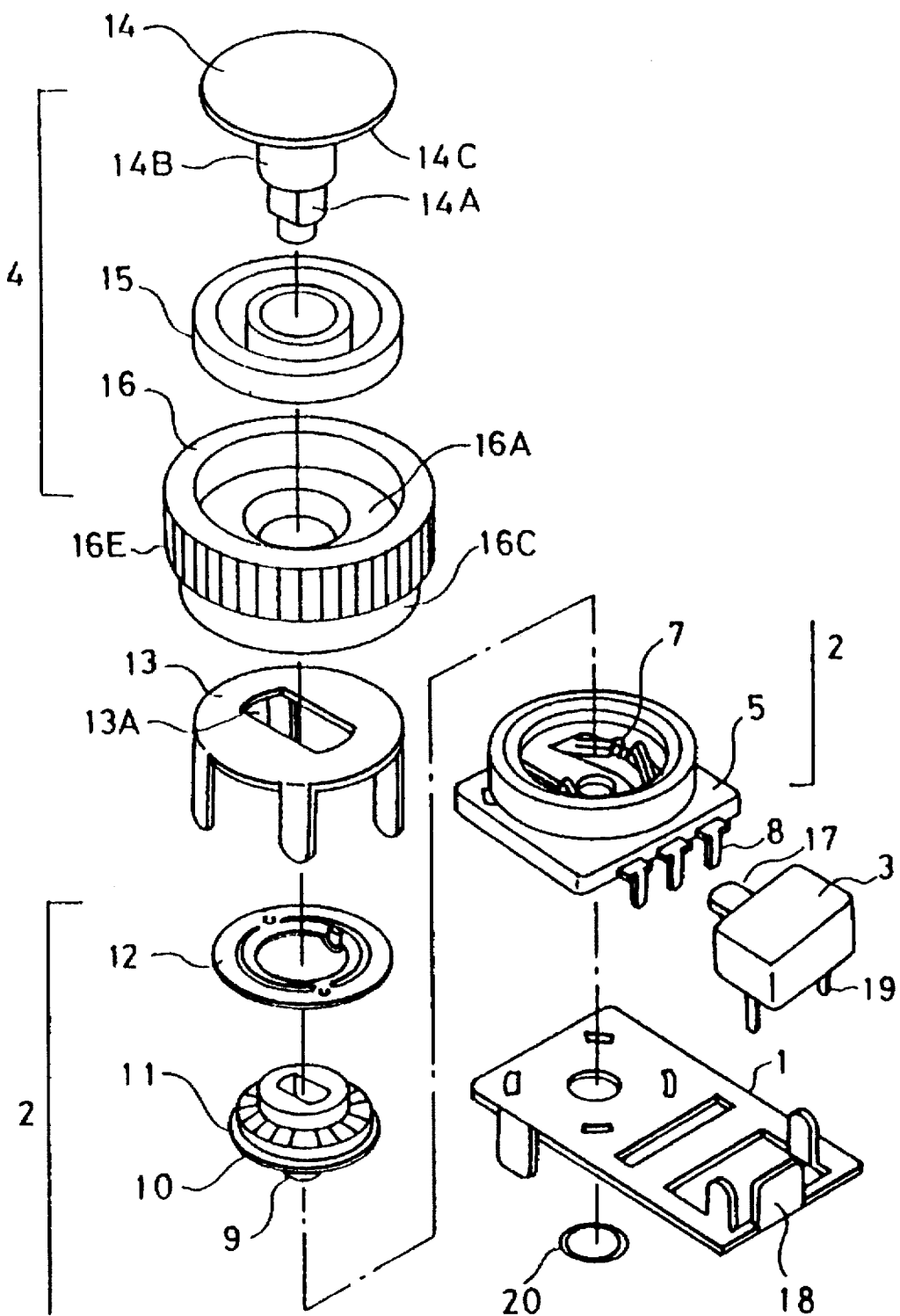
FIG. 3 is an exploded perspective view of the rotary encoder with the push switch.

With reference to FIGS. 2 and 3, the encoder portion 2 includes: a box-like case 5 molded of a resin; resilient contact legs 7 extending upwardly from a thin metal sheet 6 insert-molded in the bottom of the box-like case 5; connecting terminals 8 extending downwardly from a side end of the thin metal sheet 6; a disc-shaped rotary body 11 molded of a resin, and having a radial contact plate 10 disposed on the lower surface thereof and a central shaft 9 held thereby for horizontal rotation about the center of the bottom of the box-like case 5; and a lid plate 12 for holding down the rotary body 11 from the upper side thereof to prevent the rotary body 11 from floating upwardly.

A mounting metal element 13 fixes the encoder portion 2 on the mounting plate 1.

The control knob 4 comprises a knob shaft 14, a tubular resilient portion 15, and a knob operating portion 16. The knob shaft 14 includes an oval-shaped shaft portion 14A fitted in a through-hole with an oval-shaped inner periphery formed in the central shaft 9 of the rotary body 11 of the encoder portion 2 without a play in the direction of rotation, a large-diameter shaft portion 14B formed on the shaft portion 14A, and a collar portion 14C. The tubular resilient portion 15 is concentrically fitted around the outer periphery of the large-diameter shaft portion 14B and is of an N-shaped cross-sectional configuration. The tubular resilient portion 15 has an upper surface in contact with the collar portion 14C of the knob shaft 14. The knob operating portion 16 includes a receiving portion 16A for receiving the resilient portion 15 fitted concentrically around the outer periphery of the shaft portion 14B, a tubular portion 16B formed under the inner periphery of the receiving portion 16A and fitted in an elliptical hole 13A formed in the mounting metal element 13 along the minor axis thereof, and a tubular portion 16C formed under the outer periphery of the receiving portion 16A.

The resilient portion 15 is formed of a rubber or a polyester elastomer. Thus, the resilient portion 15 is easyto-compress in the horizontal direction and difficult-to-twist in the direction of rotation against a pressing force from an outer peripheral portion 16E of the knob operating portion 16 of the control knob 4 because of its resilience and N-shaped cross-sectional configuration.

The tubular portion 16B of the knob operating portion 16 is fitted in the elliptic hole 13A formed in the mounting metal element 13 along the manor axis thereof to limit the direction of the horizontal movement of the control knob 4. Tubular projections 16D formed on the lower surface of the receiving portion 16A move in contact with the upper surface of the mounting metal element 13 to prevent the backlash of the control knob 4 during the horizontal movement of the control knob 4.

The tubular portion 16C of the knob operating portion 16 functions to depress a horizontally protruding operating button 17 when the control knob 4 is moved horizontally. The lower end portion of the knob shaft portion 14 is inserted in a seat 20 and then crimped to allow the control knob 4 to be rotatably mounted to the box-like case 5 of the encoder portion 2.

The control knob 4 and the encoder portion 2 may be mounted together by using a push nut or the like.

The operating button 17 of the switch portion 3 is directed toward the encoder portion 2 as shown in FIG. 2.

The switch portion 3 is fixed on the mounting plate 1 so that the rear end thereof contacts a push stop wall 18, and further includes connecting terminals 19 extending downwardly.

Figure 4:
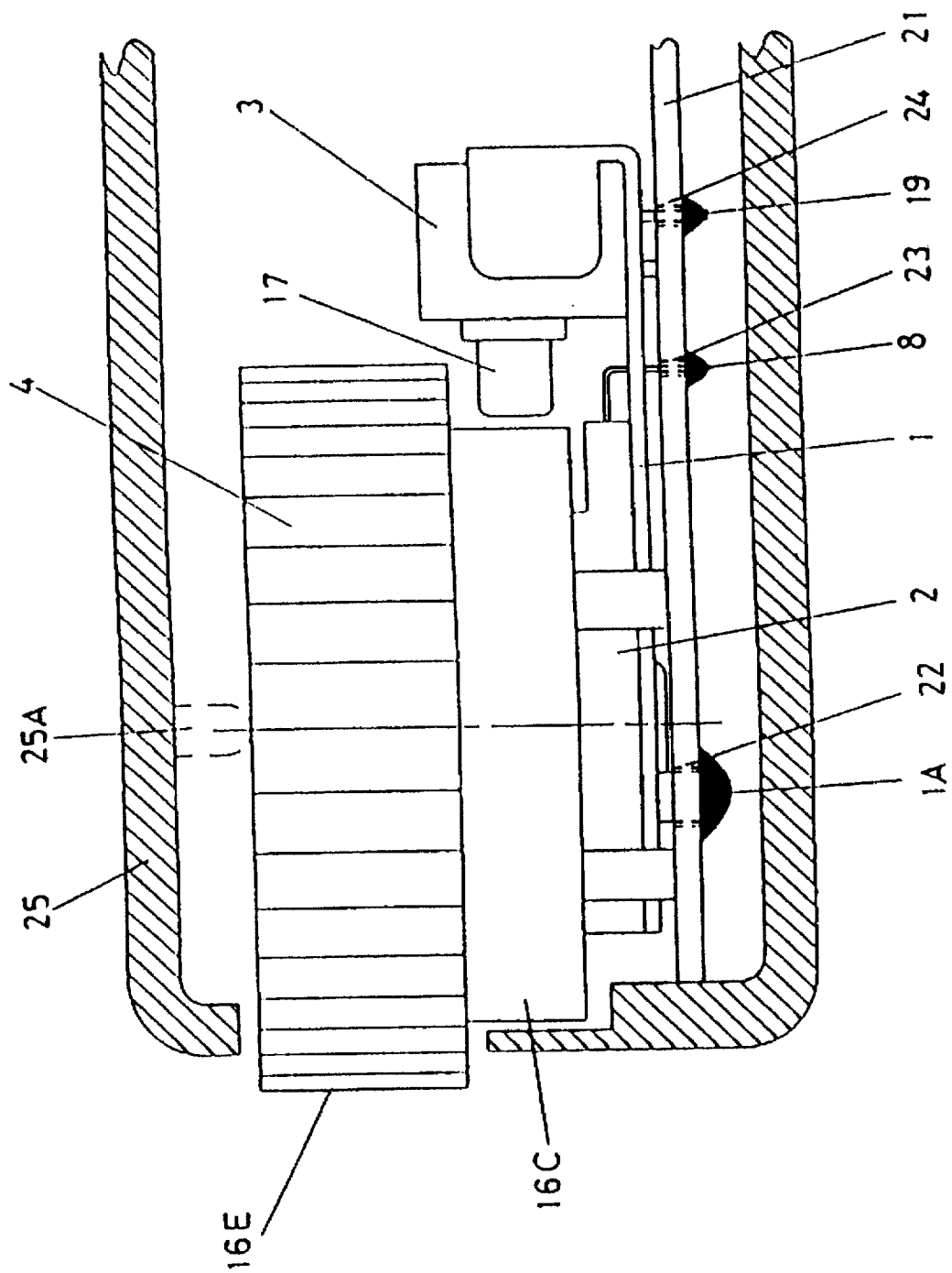
FIG. 4 is a fragmentary sectional view of the rotary encoder with the push switch mounted in an equipment to be used.

The rotary encoder with the push switch of this embodiment is constructed as described above. To mount the rotary encoder with the push switch of this embodiment in an electronic equipment, as shown in FIG. 4, leg portions 1A on the lower surface of the mounting plate 1, the connecting terminals 8 of the encoder portion 2 and the connecting terminals 19 of the switch portion 3 are respectively inserted into mounting holes 22, 23 and 24 of a printed circuit board 21 of the equipment and are soldered for connection. The rotary encoder with the push switch is mounted in the electronic equipment in such a manner that the outer peripheral portion 16E of the disc-shaped control knob 4 on the opposite side from the switch portion 3 projects outwardly through a clearance of an exterior case 25 of the equipment.

A projection 25A may extend downwardly from an upper portion of the exterior case 25 of the equipment to hold down the upper surface center of the control knob 4, preventing the control knob 4 from floating upwardly.

There will next be explained the operation of the rotary encoder with the push switch according to this embodiment.

Referring again to FIG. 2, when the disc-shaped control knob 4 mounted on the top end of the encoder portion 2 is rotated by applying a force to the outer peripheral portion 16E in a tangential direction thereof, the disc-shaped rotary body 11 of the encoder portion 2 rotates about the center of the bottom surface of the box-like case 5 through the resilient portion 15 and knob shaft 14 of the control knob 4. Then, the resilient contact legs 7 resiliently slides on the radial contact plate 10 on the lower surface of the rotary body 11. The contact portion of the resilient contact legs 7 and the radial contact plate 10 produces a pulse signal in response to the rotation of the disc-shaped control knob 4.

The pulse signal is transmitted from the resilient contact legs 7 through the connecting terminals 8 to a circuit in the printed circuit board 21 of the equipment being used.

Figure 5:
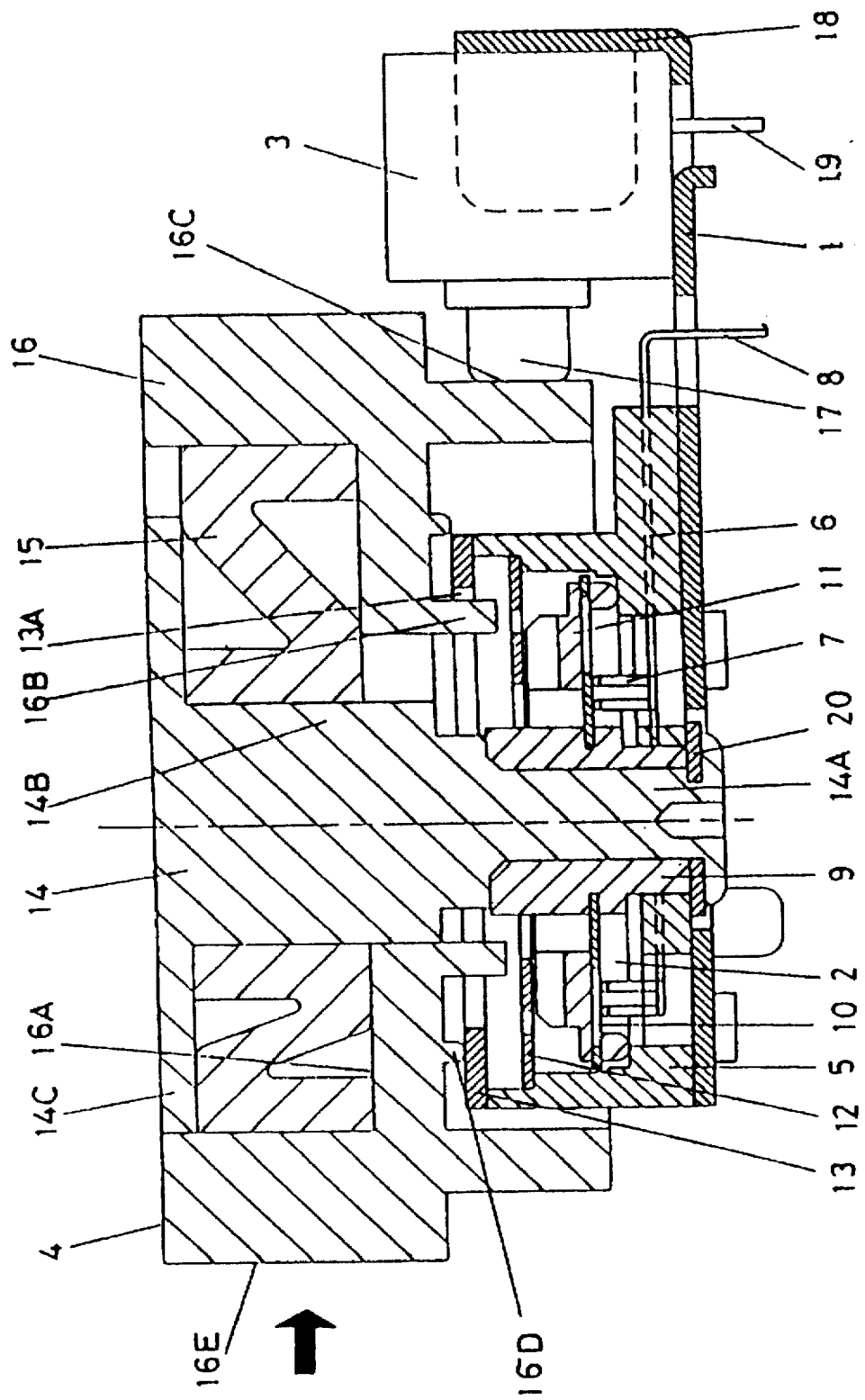
FIG. 5 is a side sectional view of the rotary encoder with the push switch in a state where a control knob thereof is depressed horizontally.

As illustrated in FIG. 5, when a force is applied to the outer peripheral portion 16E of the knob operating portion 16 of the disc-shaped control knob 4 in the direction of a line connecting the control knob 4 and the switch portion 3, as indicated by the arrow of FIG. 5, against the urging force of the resilient portion 15 which urges the control knob 4 so that the control knob 4 is in a position apart from the switch portion 3, the resilient portion 15 of the control knob 4 is compressed, and the tubular portion 16B is guided along the minor axis of the elliptical hole 13A of the mounting metal element 13 to move the knob operating portion 16 of the control knob 4 in the horizontal direction. The tubular portion 16C of the knob operating portion 16 depresses the operating button 17 to actuate the switch potion 3. Then, a signal from the switch portion 3 is transmitted through the connecting terminals 19 to the circuit in the printed circuit board 21 of the equipment being used.

When the force applied to the disc-shaped control knob 4 is released, the knob operating portion 16 is pushed back by the resilient restoring force of the resilient portion 15 to return to the original position shown in FIG. 2.

In the foregoing embodiment, the rotary encoder is described as an example of the electronic component to be horizontally rotated. However, other electronic components may be employed such as a rotary variable resistor.

[EFFECT OF THE INVENTION]

It is apparent from the description of the embodiment that the rotary electronic component with the push switch according to the present invention is adapted to individually operate the horizontally rotative component portion and the push switch portion by using the single control knob. This is advantageous in size reduction of remote controllers or portable electronic equipments and in facilitation of operation, since there is no need for an operator to move his fingers from one control knob to another control knob in order to successively manipulate the rotary component portion and the push switch portion.

Further, the horizontally rotative component portion and the push switch portion can be mounted on the single mounting base plate and handled as a single unified component. This allows the rotary component portion and the push switch portion to be held in correct positional relationship to ensure a reliable operation when the push switch portion is pushed, and facilitates the mounting of the rotary electronic component with the push switch in an electronic equipment.

We claim:

1. A rotary electronic component with a push switch comprising:

a rotary component portion having a rotary body horizontally rotatable in a fixed position;

a knob shaft for horizontally rotating the rotary body of the rotary component portion;

a control knob concentrically fitted around an outer periphery of the knob shaft and horizontally movable within a predetermined range;

a resilient element disposed between the knob shaft and an inner periphery of the control knob;

a push switch portion operated when the resilient element is compressed to push the control knob in a horizontal direction; and a mounting base plate for retaining the rotary component portion and the push switch portion in a predetermined positional relationship.

2. A rotary electronic component with a push switch as set forth in claim 1, wherein the rotary body of the rotary component portion has an elliptical hole, and wherein the control knob has a projection guided in a predetermined horizontal direction by the elliptical hole.

3. A rotary electronic component with a push switch as set forth in claim 1, wherein the resilient element is of an N-shaped cross-sectional configuration.

* * * * *

UNITED STATES PATENT AND TRADEMARK OFFICE
CERTIFICATE OF CORRECTION

PATENT NO : 5,711,415
DATED : January 27, 1998
INVENTOR(S): Tetsuya Fukuda and Tetsuji Ryu It is certified that error appears in the above-identified patent and that said Letters Patent are hereby corrected as shown below:

On the cover sheet at item [73] Assignee add -- NIFCO, INC., Japan --

Signed and Sealed this

Twenty-ninth Day of May, 2001

*Attest:*

NICHOLAS P. GODICI

*Attesting Officer*     *Acting Director of the United States Patent and Trademark Office*